June 7, 1966   P. E. VAN HORN, SR   3,254,385
RETAINER CLIP FOR A UNIVERSAL JOINT SPIDER
Filed July 14, 1964
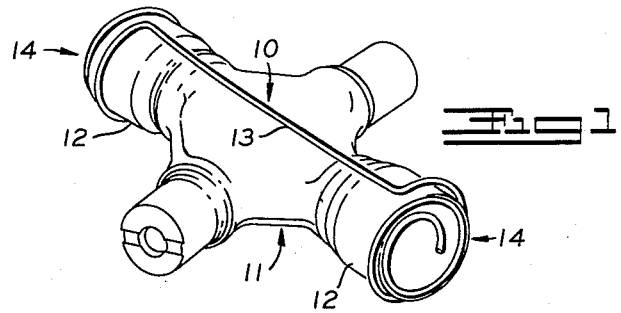
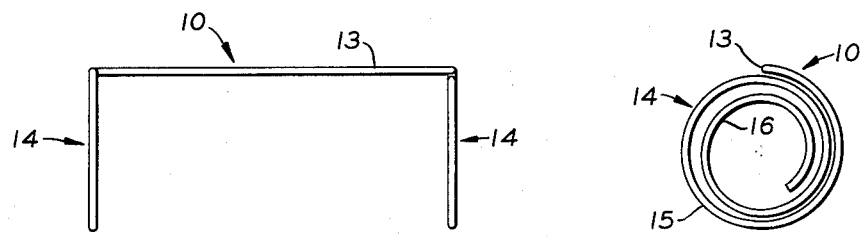
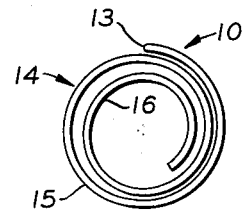
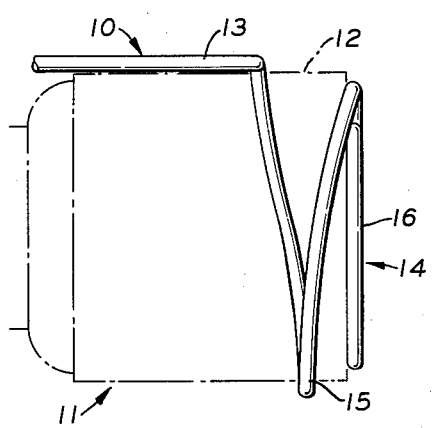
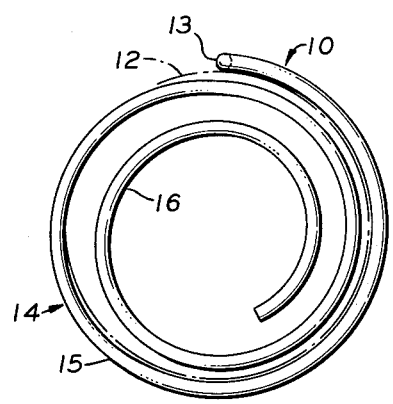
INVENTOR.
PYRL E. VAN HORN SR.
BY MAHONEY, MILLER & RAMBO
ATTORNEYS United States Patent Office 3,254,385
Patented June 7, 1966

3,254,385
RETAINER CLIP FOR A UNIVERSAL JOINT SPIDER
Pyrl E. Van Horn, Sr., Columbus, Ohio, assignor to Ohio Wire Spring Co., Columbus, Ohio, a corporation of Ohio
Filed July 14, 1964, Ser. No. 382,474
4 Claims. (Cl. 24—261)

This invention relates to a novel retainer clip for maintaining a pair of bearing races on the respective journals of a universal joint spider.

The retainer clip of this invention is specifically adapted to maintain a pair of bearing races in association with the respective journals which are formed on a universal joint spider. The bearing races are preliminarily assembled with the spider by the universal joint manufacturer to facilitate transportation. Heretofore, the bearing races have been secured in the desired preassembled relationship by means of rigid tie-bars temporarily welded to the bearing races or by flexible clamping bands. The welded tie bar method has not been found to be suitable because of the relatively costly operations of assembly and subsequent disassembly prior to utilization. The prior art flexible bands, while less costly to apply and remove than the welded tie bars as a result of omitting the welding operation, are difficult to attach and generally require the use of hand tools. A further disadvantage of the prior art clamping bands is that they are susceptible to inadvertent removal during shipment of the assembled spider and bearing races.

It is, therefore, the primary object of this invention to provide a novel retainer clip fabricated from resilient wire rod and which is readily capable of maintaining a pair of bearing races in assembled relationship with the respective journals of a universal joint spider.

It is another object of this invention to provide a novel retainer clip fabricated from resilient wire rod having spirally formed end portions adapted to engage the respective bearing races to prevent inadvertent disengagement as well as maintain the bearing races in the desired relationship with the spider.

It is also an object of this invention to provide a novel retainer clip which may be economically fabricated from a resilient wire rod and which may be conveniently assembled with and removed from the bearing race and spider assembly.

These and other objects and advantages of this invention will be readily apparent from the following detailed description of an embodiment thereof and the accompanying drawing.

In the drawings:

FIGURE 1 is a perspective view of an assembled universal joint spider and bearing races showing a retainer clip of this invention assembled therewith.

FIGURE 2 is an enlarged side elevational view of the retainer clip.

FIGURE 3 is an end elevational view of the clip shown in FIGURE 2.

FIGURE 4 is an enlarged, fragmentary side elevational view of the clip shown in assembled relationship with a bearing race.

FIGURE 5 is an end elevational view of the clip shown in FIGURE 4.

Having reference to the drawing, a retainer clip 10 of this invention is shown assembled with a typical universal joint spider 11 with which the clip is adapted to be utilized. The spider 11 is of a general cross-shape having two pairs of oppositely extending leg projections which have bearing journals formed thereon. A pair of bearing races 12 complete with suitable antifriction bearing rollers are shown assembled with the spider 11 in accordance with the usual practice in preparing the universal joint spiders for shipment. Each bearing race 12 is rotatable on its respective journal and may be displaced axially for removal from the spider.

The novel retainer clip 10 provided by this invention is formed from an elongated section of suitable wire rod having the desired resiliency characteristics. As best shown in FIGURES 2 and 3, the retainer clip 10 is generally U-shaped having a center tie-rod section 13 and a pair of end members 14 which are adapted to engage the respective bearing race 12 and apply an axially directed force thereto. The tie-rod 13 is of a length to extend diametrically across the spider 11 terminating adjacent the outer ends of the bearing races 12 (see FIGURE 4). The clip 10 is shown assembled with the spider 11 and bearing races 12 in FIGURE 4 with the bearing race being maintained under the desired compression and illustrates the preferred length of the tie-rod 13.

Each end member 14 is integrally formed with the tie-rod 13 comprising the terminal end portion of the wire rod blank. The terminal end portion of the wire rod blank is spirally wound forming an outer, substantially closed ring 15, and an inner ring 16 which are disposed in the same plane. The outer ring 15 is circularly shaped and is of a diameter to receive the bearing race 12. Forming a continuation of the outer ring 15 is the inner ring 16 which is formed with a radius of curvature which progressively decreases toward the terminal end of the rod blank. Thus, the inner ring 16 is formed with a diameter substantially less than the diameter of the bearing race 12 as is clearly shown in FIGURE 5 and will engage the end surface thereof. Both end members 14 are similarly formed although, in the illustrated embodiment, they are spiralled in relatively opposite directions (see FIGURE 1). The end members project laterally from the tie-rod and disposed in axial alignment.

Asssembly of the novel retaining clip 10 with a spider 11 and bearing race 12 is readily accomplished as is the subsequent removal prior to assembly of the spider with other components. With a pair of bearing races 12 assembled with a spider 11, the retaining clip 10 is first positioned with one end member 14 disposed in contacting engagement with the end face of the respective bearing race and is relatively centered thereon. Secondly, the other end member 14 is axially displaced to permit positioning of the rings 15 and 16 adjacent the end face of the opposite bearing race 12. During this second step, the outer ring 15 of the end member, initially disposed adjacent the respective bearing race, will be extended in a manner similar to a coil spring with the ring being pulled over the cylindrical bearing race. Subsequent releasing of the opposite end member 14 permits the outer ring 15 thereof to be similarly extended and pulled over the bearing race. Through the resiliency characteristic of the clip, the outer rings 15 of both end members 14 will be substantially equally extended and disposed in encircling relationship to the bearing race. At the same time, the inner rings 16 of each end member will be in contacting engagement with the respective end faces of the bearing races and a compressive force will be exerted on the bearing races.

Removal of the retainer clip 10 from an assembled relationship with a spider 11 and the pair of bearing races 12 is as readily accomplished. The procedure is merely reversed and one end member 14 is sufficiently axially displaced to permit disengaging the outer ring 15 from the respective bearing race. Subsequently, the end member and tie-rod 13 may be swung outwardly from the bearing race to completely disengage the end member 14 from the bearing race. Completion of the removal operation then merely requires release of the retaining clip as the outer ring 15 of the opposite end member 14 will retract and thereby disengage itself from the bearing race.

It is readily apparent that the novel retainer clip of this invention provides a clamping device for maintaining the bearing races in association with a universal joint spider. The retainer clip advantageously grips the bearing races to prevent inadvertent disengagement. It is readily assembled with the spider and bearing races and removed therefrom without assistance of hand tools and may be economically fabricated.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A retainer clip for assembled universal joint spider and bearing races comprising an elongated tie-rod having end members integrally formed therewith at each end and being fabricated from a resilient, wire rod material, each of said end members including a terminal end portion of said rod which is spirally coiled having at least two rings which are normally disposed in the same plane in transverse relationship to said tie-rod, said rings being dissimilar diameters with the larger thereof adapted to receive a bearing race in circling relationship and the smaller preventing passage of a bearing race therethrough.

2. A retainer clip comprising a U-shaped structure fabricated from an elongated section of a resilient wire rod including an elongated tie-rod and a pair of end members integrally formed therewith at opposite ends, each of said end members being a spirally wound coil having at least two coils formed in a plane disposed substantially transversely to the longitudinal axis of said tie-rod, said end members being disposed in axial alignment.

3. A retainer clip comprising a generally U-shaped structure fabricated from an elongated, resilient wire rod including a tie-rod and a pair of end members integrally formed therewith at opposite ends and projecting laterally therefrom in coaxial alignment, each of said end members comprising a spiral shaped coil wound in a flat plane and having more than one coil with at least one of said coils being of a diameter to permit passage of a bearing race therethrough.

4. A retainer clip comprising an elongated tie-rod and a pair of end members integrally formed with said tie-rod at opposite ends thereof and being fabricated from a resilient wire rod, said end members comprising a spiral shaped coil projecting laterally from said tie-rod in axial alignment to each other and each having at least one coil with a diameter to permit passage of a bearing race therethrough and at least one coil with a diameter to prevent passage of a bearing race therethrough.

References Cited by the Examiner

UNITED STATES PATENTS

| 65,896 | 6/1867 | Fellows | 24—261 X |
|---|---|---|---|
| 1,086,258 | 2/1914 | Wilson | 24—261 |
| 1,765,644 | 6/1930 | Aukenthaler. | |

FOREIGN PATENTS 254,858  7/1926  Great Britain.

WILLIAM FELDMAN, *Primary Examiner.*

D. GRIFFIN, *Assistant Examiner.*